United States Patent
Carstens et al.

(10) Patent No.: US 12,519,364 B2
(45) Date of Patent: Jan. 6, 2026

(54) ASSEMBLY OF AN ELECTRICAL APPARATUS HAVING A HOUSING PART, HAVING A PRINTED CIRCUIT BOARD WHICH IS ARRANGED ON THE HOUSING PART AND ON WHICH AN ELECTRICAL CIRCUIT IS ARRANGED, AND WITH A COVER WHICH, TOGETHER WITH THE HOUSING PART, ENCLOSES THE ELECTRICAL CIRCUIT

(71) Applicant: HELLA GmbH & Co. KGaA, Lippstadt (DE)

(72) Inventors: Ralf Carstens, Beckum (DE); Georg Goessmann, Moehnesee (DE); Benjamin Grothe, Wickede (DE); Barbara Hilwerling, Lippstadt (DE); Ciprian Ionel Ivanut, Timisoara (RO); Christian Praest, Langenberg (DE); Thorsten Wille-Riess, Ense (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 416 days.

(21) Appl. No.: 18/103,931

(22) Filed: Jan. 31, 2023

(65) Prior Publication Data

US 2023/0246515 A1    Aug. 3, 2023

(30) Foreign Application Priority Data

Jan. 31, 2022    (DE) .................... 10 2022 102 133.5

(51) Int. Cl.
*H02K 5/22*    (2006.01)
*H01R 12/58*    (2011.01)
(Continued)

(52) U.S. Cl.
CPC ............... *H02K 5/225* (2013.01); *H02K 7/14* (2013.01); *H02K 11/30* (2016.01); *H01R 12/58* (2013.01)

(58) Field of Classification Search
None
See application file for complete search history.

(56) References Cited

U.S. PATENT DOCUMENTS

| | | | |
|---|---|---|---|
| 2014/0091683 A1* | 4/2014 | Ito | B62D 5/0406 310/68 R |
| 2016/0036306 A1* | 2/2016 | Yamasaki | H02K 5/225 310/71 |

(Continued)

FOREIGN PATENT DOCUMENTS

| | | |
|---|---|---|
| DE | 1020110725225 A1 | 11/2012 |
| DE | 102011055599 A1 | 5/2013 |
| DE | 102018125031 A1 | 4/2020 |

*Primary Examiner* — Bernard Rojas
(74) *Attorney, Agent, or Firm* — Muncy, Geissler, Olds & Lowe, P.C.

(57) ABSTRACT

An assembly of an electrical apparatus, having a housing part, a circuit board, an electrical circuit and a cover, which together with the housing part forms an electronics chamber in which the electrical circuit is arranged. The assembly has press-fit contacts which have a press-fit section, a mounting section and a contact section, wherein the press-fit contacts have at least one first press-fit contact, the press-fit section of which is pressed into the circuit board from a first side, whose mounting section is fixed in a wall of the housing part and whose contact section protrudes into the housing part. The press-fit contacts have at least one second press-fit contact, the press-fit portion of which is pressed into the circuit board from a second side, whose mounting section is fixed in the cover and whose contact section protrudes from the cover.

6 Claims, 2 Drawing Sheets

(51) Int. Cl.
*H02K 7/14* (2006.01)
*H02K 11/30* (2016.01)

(56) References Cited

U.S. PATENT DOCUMENTS

2016/0204670 A1* 7/2016 Yamasaki .............. H02K 5/225
           310/71
2017/0302133 A1* 10/2017 Ehrsam .................. H02K 1/185
2021/0180609 A1    6/2021 Geue et al.

* cited by examiner

ASSEMBLY OF AN ELECTRICAL APPARATUS HAVING A HOUSING PART, HAVING A PRINTED CIRCUIT BOARD WHICH IS ARRANGED ON THE HOUSING PART AND ON WHICH AN ELECTRICAL CIRCUIT IS ARRANGED, AND WITH A COVER WHICH, TOGETHER WITH THE HOUSING PART, ENCLOSES THE ELECTRICAL CIRCUIT

This nonprovisional application claims priority under 35 U.S.C. § 119(a) to German Patent Application No. 10 2022 102 133.5, which was filed in Germany on Jan. 31, 2022, and which is herein incorporated by reference.

BACKGROUND OF THE INVENTION

Field of the Invention

The present invention relates to an assembly of an electrical apparatus having a housing part, having a printed circuit board arranged on the outside of the housing part, having an electrical circuit arranged on the printed circuit board, having a cover which, together with the housing part, forms an electronics chamber in which the electrical circuit is arranged, wherein the assembly comprises press-fit contacts having a press-fit section, which are pressed into the circuit board and thus attached to it and connected to the circuit, which have a mounting section and a contact section via which the circuit can be electrically contacted from the outside, wherein the press-fit contacts have at least one first press-fit contact, the press-fit section of which is pressed into the circuit board from a first side, whose mounting section is fixed in a wall of the housing part and whose contact section protrudes into the housing part, and wherein the press-fit contacts have at least one second press-fit contact, the press-fit section of which is pressed into the circuit board from a second side, whose mounting section is fixed in the cover and whose contact section protrudes from the cover.

Description of the Background Art

An electrical apparatus with such an assembly can be, for example, a pump, as known for example from publications DE 10 2011 0505 599 A1 and DE 10 2018 125 031 A1, which corresponds to US 2021/0180609, and which are herein incorporated by reference. These pumps have an electric motor as a drive, which has a stator and a rotor. The pumps also have a multi-part housing with the pump chamber, the motor chamber and an electronics chamber. In the pump chamber, the impeller is arranged, which is driven by the motor which is arranged in the motor chamber. In the electronics chamber, the electrical circuit is provided, with which the motor can be controlled and/or regulated. The impeller and a rotor of the motor are connected via the shaft. The shaft is guided through a wall of the housing, by which the pump chamber and the motor chamber are separated from each other.

The stator is arranged in the housing part of the assembly that encloses the motor chamber in which the rotor is arranged. The electronics chamber in which the circuit intended to control the motor is arranged is formed by the cover of the assembly and the housing part of the assembly.

In an assembly of such a pump, as described above, first press-fit contacts may be provided, which connect the circuit provided as a controller for the motor and the stator. These first press-fit contacts are passed through a wall of the housing part in which the stator is arranged and fastened. When assembling a printed circuit board on which the circuit is arranged, press-fit sections of the first press-fit contacts are made into holes in the circuit board provided for this purpose, thereby establishing a mechanical connection between the circuit board and the housing part and an electrical connection between the circuit and the motor.

The second press-fit contacts are attached to the cover, wherein press-fit sections of these second press-fit contacts protrude from the cover. If the cover is now mounted on the housing part, the press-fit sections of the second press-fit contacts are inserted into additional holes provided for this purpose. Since the electronics chamber forms a closed chamber after mounting the cover, it is not easy to check after assembly whether the press-fit sections of the second press-fit contacts have been inserted into the additional holes provided for this purpose. An electrical function test of the pump does not provide any insights here, since an electrical connection between the circuit and the second press-fit contacts can be established without a mechanical connection being established. X-ray would be one way to determine this. However, X-ray is very complex.

SUMMARY OF THE INVENTION

It is therefore an object of the present invention to provide a simple test of the connection, in particular the mechanical connection between the second press-fit contacts and the circuit board.

This object can be achieved in an exemplary embodiment, in that an area of the circuit board, from which the ends of the press-fit portion of the at least one second press-fit contact protrude, and the housing part limit a space which is not connected to the electronics chamber and into which an end of the press-fit section of the at least a second press-fit contact protrudes from the circuit board on its first side. This space has an opening to the outside, which can be used to check the connection between the second press-fit contact and the printed circuit board. The opening can also be used for visual inspection by means of a camera. There may be a connection between this space and the electronics chamber. If so, dirt or moisture can enter the electronics chamber through the opening. It is possible that the opening is closed with a stopper, another component, e.g., another cover or the like, or a sealing option provided on the housing part or the cover or is filled with a potting compound or the like, so that the second press-fit contacts are also protected from environmental influences. It is also possible that there is no connection between the space and the electronics chamber.

The opening can provide, at least prior to closing of the same, a view of the end of the press-fit section of the at least one second press-fit contact protruding from the circuit board on its first side. This means that there is a line of sight between the opening and the press-fit section of the at least one second press-fit contact, whereby a direct view of the press-fit contact is possible.

The second space may also be limited by a part of the cover.

The housing part and/or the cover may have a recess in the area of the space. Such recess or recesses may form part of the opening or the opening, or part of the space or the space.

The at least one second press-fit contact may comprise a connector section which is a contact of a connector part. This connector part can be connected to a complementary connector part to provide a plug connection through which the electrical apparatus, of which the assembly may be a part, may be connected to a power supply or a higher-level controller, data bus, or similar.

In an electrical apparatus according to the invention, which has an electric drive and an assembly according to the invention, the housing part of the assembly accommodates a stator of the drive of the apparatus. Such an apparatus according to the invention may be a pump, in particular a pump for a motor vehicle. The housing part can form a motor chamber in which a rotor of the motor is rotatable. Another housing part may be connected to the housing part. This additional housing part can form a pump chamber in which an impeller of the pump is rotatably mounted. The impeller and the rotor are connected such that the rotation of the rotor can be transferred to the impeller.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
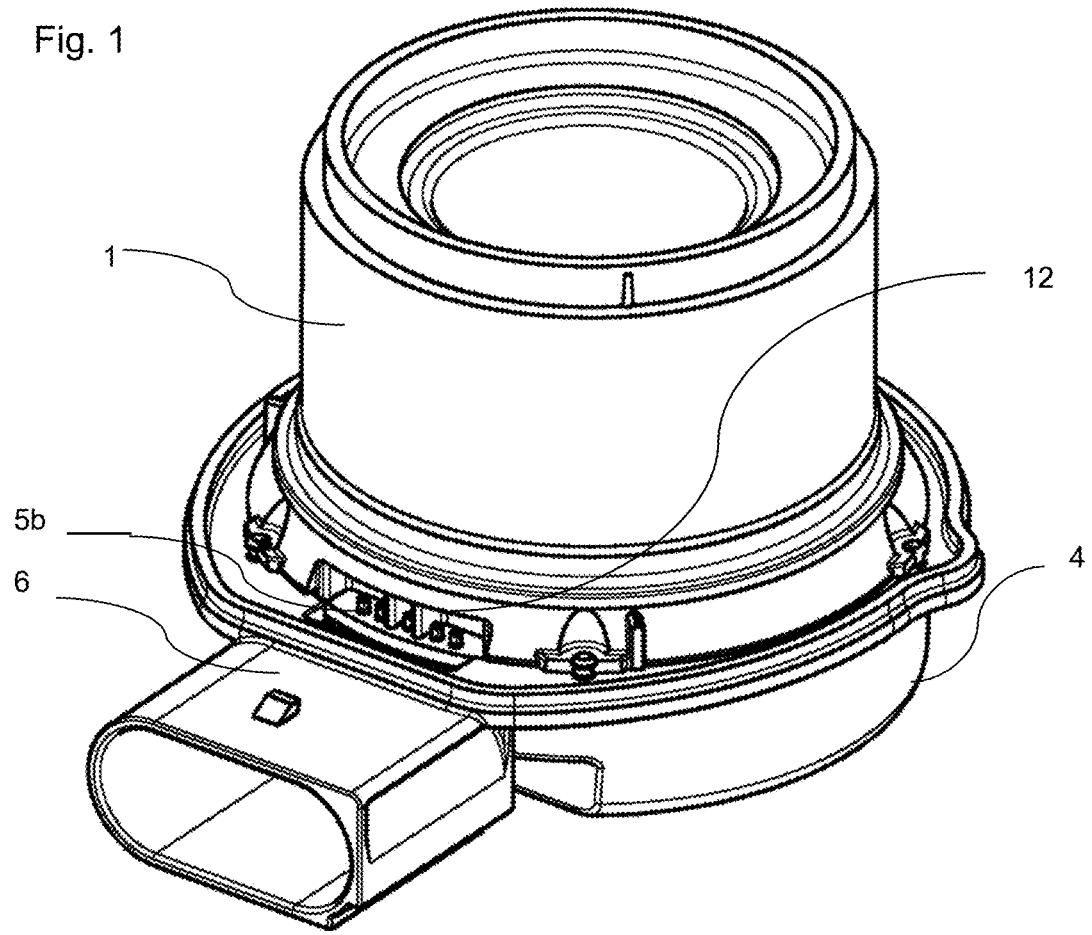
FIG. 1 is a perspective representation of an assembly according to the invention.
Figure 2:
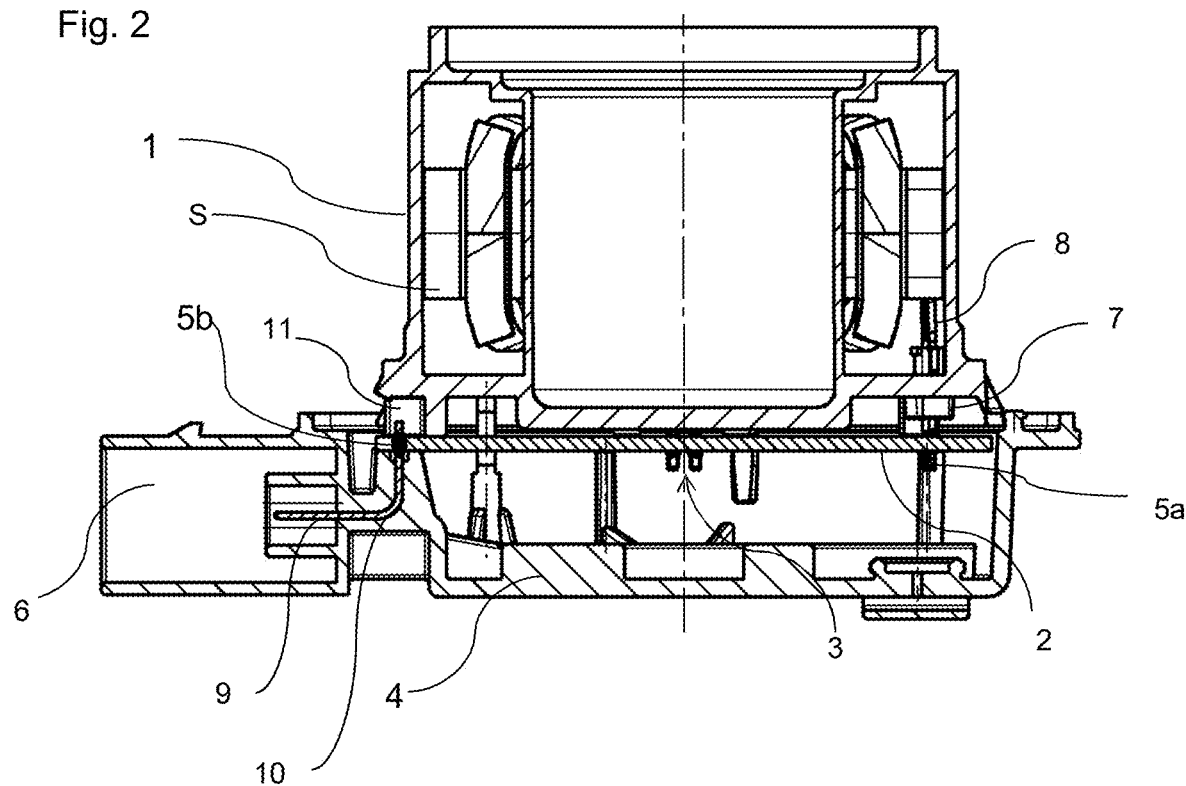
FIG. 2 is a sectional representation of the assembly according to the invention.

The assembly according to the invention comprises a housing part 1, a printed circuit board 2, a circuit 3 arranged on the circuit board 2, a cover 4, press-fit contacts 5a, 5b and a connector part 6. The housing part 1, the cover 4 and the connector part 6 can be plastic injection molded parts. The connector part 6 may be connected one-piece to the cover 4.

The housing part 1 is designed like a pot and the interior of the pot-like housing part 1 forms a motor chamber in which a rotor of an electric motor is arranged. In a tube-like wall of the housing part 1, a ring-shaped cavity is provided in which a stator S of a motor is arranged.

A front wall of the housing part 1 and the cover 4 form an electronics chamber of the assembly in which the circuit board 2 is arranged for the most part and the circuit 3 is wholly disposed.

The circuit 3 is connected to the stator S. For this purpose, first press-fit contacts 5a of the press-fit contacts 5a, 5b are arranged in the front wall of the housing part 1. These first press-fit contacts 5a have a press-fit section which is pressed into the circuit board 2 and thus attached to it and electrically connected to the circuit 3, a mounting section 7 which is embedded in the front wall, whereby the first press-fit contacts are firmly connected to the housing part 1, and which have a contact section 8 via which the first press-fit contacts 5a and thus the circuit 3 are electrically connected to the stator S.

The circuit 3 is also connected to a connector that comprises the connector part 6. For this purpose, second press-fit contacts 5b of the press-fit contacts 5a, 5b are arranged in the connector part 6 and the cover 4. These second press-fit contacts 5b have a press-fit section, which is pressed into the circuit board 2 and thus attached to it and electrically connected to the circuit 3, whose mounting section 10 is embedded in the cover 4 or the connector part 6, whereby the second press-fit contacts are firmly connected with the cover 4 or the connector part 6, and which have a contact section 9 which protrudes into the connector part 6 and forms, together with the connector part 6, a device connector.

The press-fit contacts 5a, 5b are pressed into the printed circuit board 2 from different sides. The first press-fit contacts 5a from a first side of the printed circuit board 2 and the second press-fit contacts 5b from a second side of the printed circuit board 2, on which also components of the circuit 3 are arranged. However, components of the circuit can also be arranged on the first side.

The mounting of the assembly is carried out in such a way that the circuit board 2, on which the circuit 3 is already provided, is mounted on the housing part 1. For this purpose, the press-fit sections of the first press-fit contacts 5a are inserted into the holes provided for this purpose in the printed circuit board 2 and pressed in. A visual inspection can then check whether the press-fit sections of the first press-fit contacts 5a are neatly inserted into the holes of the printed circuit board 2 and sit firmly in these holes. Then, the cover 4 and the connector part 6 are placed on the circuit board 2 and press-fit sections of the second press-fit contacts 5b are inserted into holes provided for this purpose in the circuit board 2 and pressed in. In order to be able to check by means of a visual inspection whether the second press-fit contacts are inserted into the holes as desired and firmly pressed in there, the holes of the printed circuit board 2, into which the press-fit sections of the second press-fit contacts 5b are pressed in, are arranged in an area of the printed circuit board 2, which is not arranged in the electronics chamber of the assembly. The area of the printed circuit board 2 and the housing part 1 limit a space 11 in which ends of the press-fit sections of the second press-fit contacts 5b protrude from the first side of the printed circuit board 2. The ends of the press-fit sections of the second press-fit contacts 5b, which protrude from the first side of the circuit board from this, are arranged in a recess that forms an opening 12 in the housing part 1, which is open to the outside. This makes it possible, after pressing the second press-fit contacts into the holes provided for this purpose on the circuit board, to check by means of a visual inspection whether the assembly was faulty or not. After such a check, the recess can be sealed. For this purpose, another component or a potting compound can be used to fill the recess. Likewise, the recess can be closed by another means, if this is useful or necessary.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An assembly of an electrical apparatus, the assembly comprising:
   a housing part;
   a printed circuit board arranged on an outside of the housing part;
   an electrical circuit arranged on the printed circuit board;
   a cover which, together with the housing part, forms an electronics chamber in which the electrical circuit is arranged; and press-fit contacts each having a press-fit section, the press-fit sections being pressed into the printed circuit board to attach the press-fit contacts to the printed circuit board and to connect the press-fit contacts to the circuit, the press-fit contacts further having a mounting section and a contact section via which the circuit is adapted to be electrically contacted from the outside, wherein the press-fit contacts include at least one first press-fit contact and at least one second press-fit contact, wherein the press-fit section of the at least one first press-fit contact is pressed into the printed circuit board from a first side of the printed circuit board so as to extend through the printed circuit board and protrude from a second side of the printed circuit board, the mounting section of the at least one first press-fit contact is fixed in a wall of the housing part and the contact section of the at least one first press-fit contact protrudes into the housing part, wherein the press-fit section of the at least one second press-fit contact is pressed into the printed circuit board from the second side of the printed circuit board so as to extend through the printed circuit board and protrude from the first side of the printed circuit board, the mounting section of the at least one second press-fit contact is fixed in the cover and the contact section of the at least one second press-fit contact protrudes from the cover, wherein an area of the printed circuit board and the housing part limit a space into which an end of the press-fit section of the at least one second press-fit contact protrudes from the first side of the printed circuit board, and wherein the space has an opening to the outside of the assembly, and wherein, in a state in which the cover is assembled to the housing part, the opening provides a view of the end of the press-fit section of the at least one second press-fit contact that protrudes from the first side of the printed circuit board.

2. The assembly according to claim 1, wherein the space is also limited by a part of the cover.

3. The assembly according to claim 1, wherein the housing part and/or the cover form a recess in the area of the space.

4. The assembly according to claim 1, wherein the contact section of the at least one second press-fit contact forms a connector section which is a contact of a connector part.

5. An electrical apparatus comprising an electric drive and an assembly according to claim 1, wherein the housing part accommodates a stator of the drive of the apparatus.

6. The apparatus according to claim 5, wherein the apparatus is a pump for a motor vehicle.

* * * * *